United States Patent
Togino

(10) Patent No.: US 6,646,812 B2
(45) Date of Patent: Nov. 11, 2003

(54) DE-CENTERED OPTICAL SYSTEM AND OPTICAL APPARATUS EQUIPPED THEREWITH

(75) Inventor: Takayoshi Togino, Koganei (JP)

(73) Assignee: Olympus Optical Co., Ltd., Tokyo (JP)

( * ) Notice: Subject to any disclaimer, the term of this patent is extended or adjusted under 35 U.S.C. 154(b) by 0 days.

(21) Appl. No.: 10/055,036

(22) Filed: Jan. 25, 2002

(65) Prior Publication Data

US 2002/0181116 A1 Dec. 5, 2002

(30) Foreign Application Priority Data

Jan. 29, 2001 (JP) ........................................ 2001-019653

(51) Int. Cl.⁷ .............................................. G02B 27/14
(52) U.S. Cl. ........................ 359/631; 359/638; 359/637; 359/633
(58) Field of Search ................................. 359/631, 633, 359/637, 630, 638, 636, 634; 345/7, 8, 9

(56) References Cited

U.S. PATENT DOCUMENTS

| | | | |
|---|---|---|---|
| 4,322,135 A | 3/1982 | Freeman | 359/643 |
| 5,706,136 A | * 1/1998 | Okuyama et al. | 359/630 |
| 5,745,295 A | 4/1998 | Takahashi | 359/631 |
| 5,815,326 A | 9/1998 | Takahashi | 359/729 |
| 5,818,641 A | 10/1998 | Takahashi | 359/629 |
| 5,886,824 A | 3/1999 | Takahashi | 359/633 |
| 6,014,261 A | 1/2000 | Takahashi | 359/633 |
| RE37,175 E | * 5/2001 | Takahashi | 359/631 |
| 6,259,564 B1 | 7/2001 | Kamo | 359/627 |

FOREIGN PATENT DOCUMENTS

| | | | |
|---|---|---|---|
| JP | 6-347708 | 12/1994 | G02B/25/00 |
| JP | 8-313829 | 11/1996 | G20B/25/00 |
| JP | 8-320452 | 12/1996 | G02B/27/02 |
| JP | 9-113841 | 5/1997 | G02B/27/02 |
| JP | 9-146037 | 6/1997 | G02B/27/02 |
| JP | 9-197336 | 7/1997 | G02B/27/02 |
| JP | 10-75407 | 3/1998 | G02B/27/02 |
| JP | 10-260357 | 9/1998 | G02B/17/08 |
| JP | 11-288021 | 10/1999 | G02B/13/08 |
| JP | 2000-10042 | 1/2000 | G02B/27/02 |
| JP | 2000-155357 | 6/2000 | G02B/13/06 |

* cited by examiner

*Primary Examiner*—Ricky Mack
(74) *Attorney, Agent, or Firm*—Kenyon & Kenyon

(57) ABSTRACT

A de-centered optical system includes a first optical element having at least three surfaces surrounding a portion having a refractive index of more than 1, and a second optical element whose surface further from the first optical element is a convex surface and has a positive power and produces chromatic aberration of magnification. When the de-centered optical system is used as an ocular optical system of an image observation apparatus, the image size observed through the de-centered optical system in the blue wavelength is larger than that formed in the green wavelength, and that formed in the green wavelength is larger than that formed in the red wavelength. The difference can be compensated by an electronic compensation means. This optical system can be used as an image taking optical system by setting the light traveling direction inversely to that in case when it is used as an ocular optical system.

12 Claims, 10 Drawing Sheets

DE-CENTERED OPTICAL SYSTEM AND OPTICAL APPARATUS EQUIPPED THEREWITH

CROSS-REFERENCE TO RELATED APPLICATION

This invention claims the priority of patent application Ser. No. 2001-19653, filed Jan. 29, 2001, in Japan, the contents of which is hereby incorporated by reference.

BACKGROUND OF THE INVENTION

1. Field of the Invention

This invention relates to a de-centered optical system and an optical apparatus such as an image observation apparatus, an image projection apparatus, an image taking apparatus and so on, in which a de-centered optical system is provided as an optical system.

2. Description of the Related Art

Laid open Japanese Patent publications Hei 8-313829 and Hei 9-113841(counterpart U.S. Pat. No. 5,818,641) disclose an image observation apparatus of the face mounting type using a de-centered optical system as an ocular optical system thereof to guide light from an image display device to an observer's eye. The ocular optical system has a prism having three optical surfaces of a first, second and third optical surface arranged in this order inversely along the light traveling direction from the display device. The first optical surface has refracting and internal reflecting functions, the second optical surface is a reflecting surface positioned opposite to the first optical surface and has a positive optical power and is de-centered from the optical axis of the ocular optical system, and the third optical surface is a refracting surface for refracting light refracted by the first optical surface and reflected by the second optical surface and further reflected by the first optical surface.

Laid open Japanese Patent publication Hei 9-146037 (counterpart U.S. Pat. No. 5,745,295) discloses an ocular optical system having a prism, similar to the above described one, as a first optical element and a positive lens disposed on the observer's eye side of the prism as a second optical element.

Laid open Japanese Patent publication Hei 6-347708 discloses an image observation apparatus or an image projection apparatus, in which the size of an image appearing on the image display device varies in dependence on the color thereof, in order to cancel chromatic aberrations of an optical system used in the apparatus.

Among above described known apparatus, the one disclosed in laid open Japanese Patent publication Hei 9-146037 has realized both a wide angle of view and good correction of aberration. However, as the second optical element is a positive lens having a concave surface on its observer's eye side, the optical system is not sufficiently miniaturized. Moreover the positive power of the second optical element produces a large amount of chromatic aberration of magnification.

SUMMARY OF THE INVENTION

This invention will provide an optical system having a wide angle of view which is small in size and suitable for an ocular optical system of an image observation apparatus to observe an image appearing on an image display device or a projection optical system of an image projection apparatus to project an image appearing on an image display device. This optical system can be used as an image taking optical system by setting the light traveling direction inversely to that of the case where it is used as an ocular optical system.

The de-centered optical system according to this invention comprises a first optical element and a second optical element. The first optical element has at least three optical surfaces, i.e., first, second and third optical surfaces, and the portion surrounded by these three surfaces is made of a medium having a refractive index of more than 1. The first optical surface has a function of refraction and reflection of light inside the optical element. The second optical surface is disposed on a de-centered position from an optical axis that is a center line of a light bundle and shaped as a curved surface having a positive optical power when reflecting light inside the optical element. The third optical surface has a function of refraction. These three optical surfaces are so configured that when light enters into the first optical element from the first optical surface, the light that entered from the first optical surface is reflected by the second optical surface inside the optical element in an oblique direction toward an area on the first optical surface not completely overlapping the entrance area of the first optical surface, is reflected by the first optical surface, and then exits from the third optical surface. The second optical element is disposed outside in front of the first optical surface of the first optical element. The surface of the second optical element disposed furthest from the first optical element is a convex surface and has a positive optical power and produces a chromatic aberration of magnification.

When light travels through the de-centered optical system in the direction from the second optical element toward the first optical element, the size of an image formed by the de-centered optical system in the blue light wavelength region is larger than that formed in the green wavelength region, and that formed in green wavelength region is larger than that formed in the red wavelength region.

When the de-centered optical system is used as an ocular optical system of an image observation apparatus, an image display device is disposed outside the third optical surface of the first optical element and an observer's eye is positioned outside the second optical element. The light emanated from the image display device enters the first optical element through the third optical surface, is reflected by the first optical surface, then reflected by the second optical surface, and exits the first optical element through the first optical surface. Then the light goes through the second optical element and reaches the observer's eye.

When the de-centered optical system is used as an image taking optical system, external light coming from an object is transmitted through the second optical element and enters the first optical element from the first optical surface. The light is reflected by the second optical surface, reflected by the first optical surface, and then exits the first optical element from the third surface and forms an image of the object. In this case, it is preferable to place the pupil of the image taking optical system at the entrance side of the second optical element. Therefore, whether it is used an ocular optical system or an image taking optical system, the first and second optical elements are placed between the pupil, that is, an observer's pupil (eye point) or the pupil of the image taking optical system (an aperture stop or a conjugate thereof) and the image surface, that is, an image display surface of the display device or the surface on which an image of an object is formed. Among the three surfaces of the first optical element, the first optical surface is closest to the pupil and the third optical surface is closest to the image surface.

Other features and advantages of this invention will become apparent from the following detailed description of the examples when taken in conjunction with the accompanying drawings and appended claims.

DETAILED DESCRIPTION OF THE SPECIFIC EXAMPLES OF THE INVENTION

Figure 1:
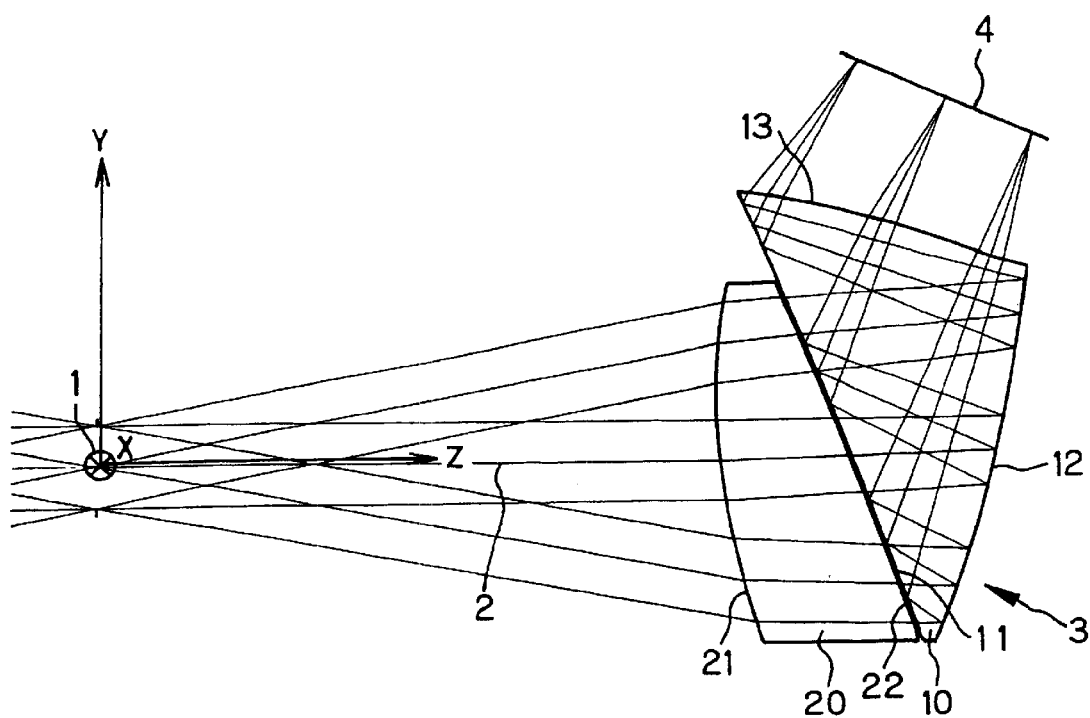
FIG. 1 is a cross-sectional view of a first example of this invention cut by the Y-Z plane.

In the following description, suppose that light rays enter the de-centered optical system from the second optical element and exit from the third optical surface of the first optical element, that is, the ray tracing process is inversely conducted to the case where it is used as an observation optical system, for the purpose of convenience of designing an optical system. The word "axis of sight" designates an axial chief ray when an observer views an image on the image display device from the front through the de-centered optical system.

The de-centered optical system according to this invention comprises a first optical element and a second optical element. The first optical element has at least three optical surfaces, i.e., first, second and third optical surfaces, in this order in the inverse direction of light traveling from an image display device to an observer's eye, and the portion surrounded by these three surfaces is made of a medium having a refractive index of more than 1. The first optical surface is a refracting surface and also a reflecting surface reflecting light inside the optical element. The second optical surface that is opposed to the first optical surface is disposed on a de-centered or a inclined position from an optical axis, and shaped as a curved surface having a positive optical power when reflecting light inside the optical element. The third optical surface is a refracting surface. The second optical element is disposed at the entrance side of the first optical surface and has a positive optical power. This combination of optical elements allows correcting coma and curvature of field due to the second optical surface disposed in de-centered position with respect to the axis of sight, and provides large exit pupil and wide angle of view.

The second optical element has a convex surface on the pupil side to strengthen the positive optical power thereof. This results in a small diameter of light bundle that enters the first optical element and contributes to provide a wide angle of view.

For the first optical element, as the second reflecting optical surface has a majority of optical power thereof, the first optical element has little chromatic aberration because a reflecting surface produces theoretically no chromatic aberration. However, when the angle of view become large, the higher order coma become large unless the diameter of the light bundle entering the first optical element is made small, and high resolution cannot be obtained.

According to this invention, the second optical element has a strong optical power for making the diameter of the light bundle entering the first optical element small and reducing the higher order coma. For this purpose, the second optical element has a convex surface on the pupil side surface. Moreover, when the second optical element is formed as a special prism having two de-centered optical surfaces, the optical power of the second optical element becomes easily asymmetric. It allows correcting asymmetric coma, that is, coma produced asymmetrically between the image display device side and the opposite side of the axis of sight and is effective to obtain a wider angle of view and a clear image quality. Further, when the second optical element is de-centered with respect to the axis of sight, the asymmetric coma is sufficiently corrected regardless of whether the shape of the second optical element is a lens or a special prism and the image display surface of the image display device and the optical axis can be approximately perpendicular with each other.

When the pupil side surface of the second optical element is formed as a convex shape in order to strengthen the optical power of the second optical element, the optical system will produce a greater amount of a chromatic aberration of magnification. By combining this optical system and an electronic chromatic aberration producing means that gives the image displayed on the image display device a chromatic aberration of magnification enough to cancel out the chromatic aberration of the optical system, a wide angle of view and clear image quality with no aberration can be realized.

Generally speaking, in an optical system having a positive optical power, the optical power for a longer wavelength is weaker than that for a shorter wavelength, that is, the focal length of the optical system for a longer wavelength is larger than that for a shorter wavelength. Therefore, when a normal image is observed through a positive optical system having a chromatic aberration of magnification, an image formed by the red light is observed relatively small and an image formed by the blue light is observed relatively large. Therefore, a colored fringe appears at the edge of the image and a high quality image cannot be obtained because of the degradation of resolution. The same phenomenon also occurs when a positive optical system is used as an image projection optical system.

In the present invention, the chromatic aberration of magnification is cancelled out by altering the size of the image displayed on the image display device color by color and the image can be observed as if it had no chromatic aberration of magnification. That is to say, the light bundle coming from the images being different in size dependent on color is overlapped to be the same size at a position of the observer's pupil in an image observation apparatus or at a position of a screen in an image projection apparatus by passing through an optical system having a chromatic aberration of magnification, and the user of these kinds of apparatus can see an image as if it had no chromatic aberration of magnification.

Assume a light ray passing through the center of the exit pupil and the center of the image display device as an axial chief ray, a plane in which the axial chief ray travels as a Y-Z plane and the direction in which the optical system is de-centered as a Y-axis. Further, the focal length Fy of the optical system in the Y-direction is defined by d/δ y where d is a small height of ray parallel to the axial chief ray in the Y-Z plane and δ y is an angle between the axial chief ray and a projection of an exit ray into the Y-Z plane when the light ray having a small height d travels through the optical system from the pupil side, and the focal length Fx of the optical system in a X-direction is defined by d/δ x where d is a small height of ray parallel to the axial chief ray in the X-direction perpendicular to the Y-Z plane and δ x is an angle between the axial chief ray and a projection of an exit ray into a plane perpendicular to the Y-Z plane and including the axial chief ray when the light ray having a small height d travels through the optical system from the pupil side. The focal lengths F2x and F2y in the X- and Y-directions of the second optical element are defined in the same manner as Fx and Fy. In this case, the optical system preferably satisfies at least one of the following numerical condition (1) and (2):

$$0.1 < Fx/F2x < 1 \quad (1)$$

$$0.1 < Fy/F2x < 1 \quad (1)$$

When the lower limit of 0.1 is exceeded, the focal length of the second optical element becomes too long and the optical power of the second optical element becomes too weak relative to the focal length of the entire optical system. This cuts back the function of the second optical element to reduce the diameter of light bundle entering the first optical element and results in a production of large amount of coma by the first optical element. In addition, the optical system becomes large because of the large diameter of the incident light bundle. When the upper limit of 1 is exceeded, the focal length of the second optical element becomes almost the same as that of the entire optical system. It means that the optical power of the second optical element become too strong relative to the first optical element and the coma produced by the second optical element will become large. In addition, in this optical system, as the Petzval's sum of the first optical element is cancelled out by that of the second optical element, the strong optical power of the second optical system brings the Petzval's sums of these two optical elements out of balance and the Petzval's sum is overcorrected and curvature of field will become large.

When at least one of the following numerical condition (1-1) and (2-1) are satisfied, more favorable result will be obtained:

$$0.2 < Fx/F2x < 0.5 \quad (1\text{-}1)$$

$$0.2 < Fy/F2y < 0.5 \quad (2\text{-}1)$$

When both of the numerical condition (1) and (2) or (1-1) and (2-1) are satisfied at the same time, still further favorable result will be obtained.

The first optical element preferably has at least one surface having an optical power and formed as a rotational asymmetric curved surface among the first, second and third optical surfaces in order to correct the de-centering aberration caused by the de-centered optical element or de-centered optical surface. In this case, it is particularly effective to give the above mentioned rotationally asymmetric shape to the second optical surface and it is also more favorable to give such shape to the third optical surface.

The optical system of this example can be used as an ocular optical system of an image observation apparatus or a projection optical system of an image projection apparatus, and moreover, can be used as an image taking optical system of an image taking apparatus. In the latter case, light enters into the side of exit pupil and a film or an image pickup device is arranged on the image surface where the image display device is placed.

In the case where the image pickup device is a color image sensor, as the chromatic aberration of magnification causes a difference in size of images formed on the image pickup device for different wavelength region, an electronic circuit processing the video signal obtained from the color image sensor preferably has a function for eliminating the above mentioned difference and reproduces a clear image of an object.

Numerical Examples

Figure 2:
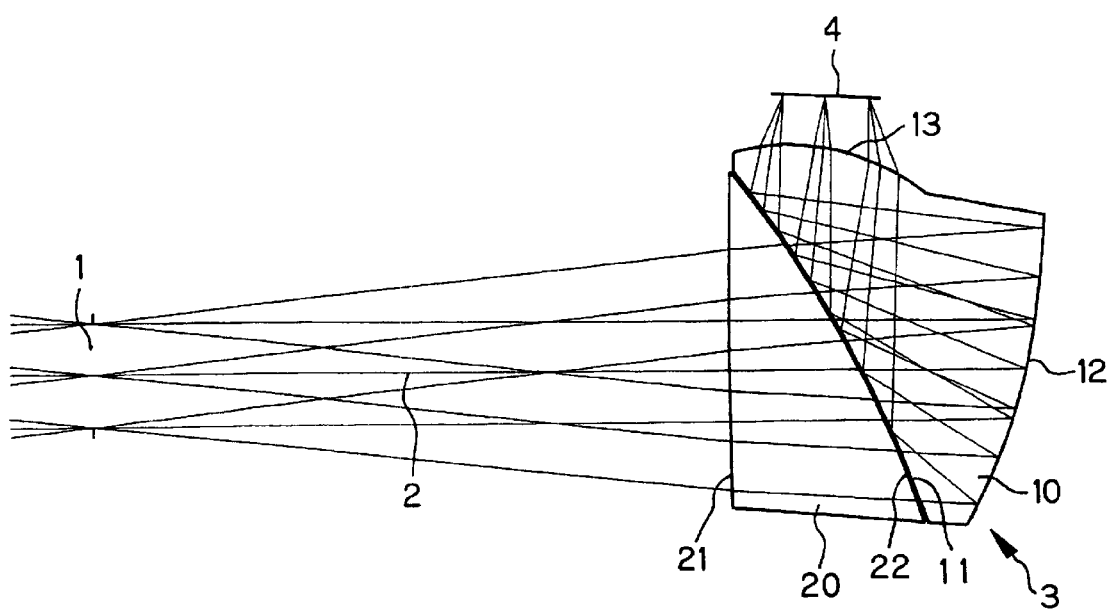
FIG. 2 is a cross-sectional view of a second example of this invention cut by the Y-Z plane.

FIGS. 1 and 2 are the cross-sectional views cut with the Y-Z plane of numerical example 1 and 2 of this invention, respectively. In the figures, reference numeral 1 denotes an exit pupil where an observer's eye is positioned when the optical system is used in an image observation apparatus. The reference numeral 3 denotes the optical system of this example as an ocular optical system. The reference numeral 4 is an image display device. The optical system 3 is composed of the second optical element 20 which is a positive lens having a first optical surface 21 and a second optical surface 22, and a first optical element 10 which is a de-centered prism having a first optical surface 11, a second optical surface 12, and a third optical surface 13, in this order in the inverted ray tracing direction. The portion of the first optical element surrounded by the first, second and third optical surfaces 11, 12 and 13 is made of a transparent medium having a refractive index more than 1. The first optical surface 11 receives light coming from the side of the pupil and in addition, reflects light reflected by the second optical surface 12 inside the prism 3. That is to say, the first optical surface has both refracting (transmitting) and reflecting functions in one surface. The second optical surface 12 reflects light entering from the first optical surface 11 inside the prism 3. The light reflected by the first optical surface 11 exits from the third optical surface 13. Outside the third surface 13 of the prism 3, an image surface is positioned facing to the third optical surface and an image display device 4 is placed thereon. The exit pupil side surface 21 of the positive lens 20 is convex toward the pupil side. The opposite side surface 22 of the positive lens 20 and the first surface 11 of the prism 10 have preferably the same or substantially same shape. In the numerical examples 1 and 2, these two surfaces are formed in the same shapes and arranged to have a small gap therebetween.

Figure 3A:
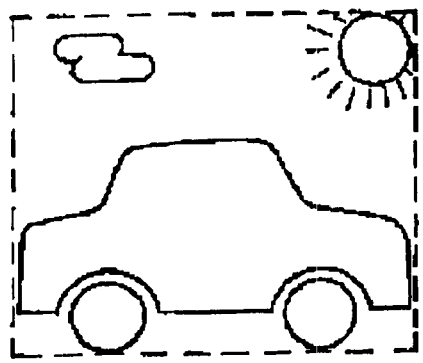
FIGS. 3A–3C are schematic views to explain the color difference caused by the examples of this invention.
Figure 3B:
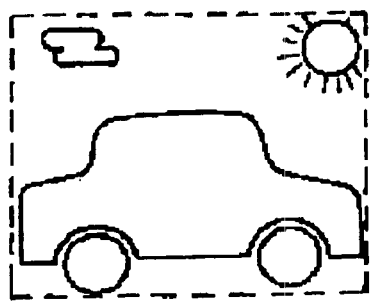
Figure 3C:
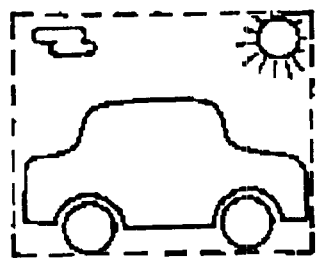
Figure 4A:
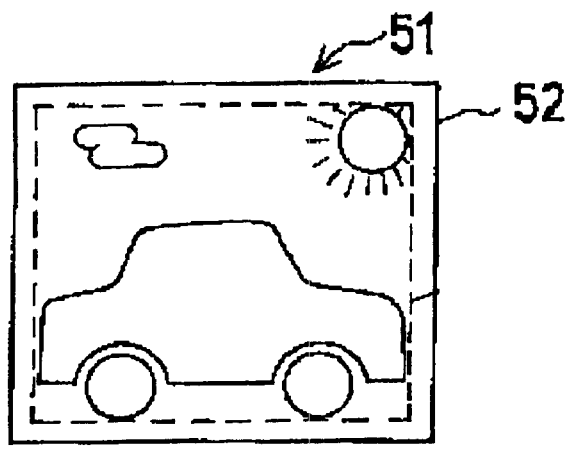
FIGS. 4A–4C are schematic views to explain the images displayed on the screen of the image display device.
Figure 4B:
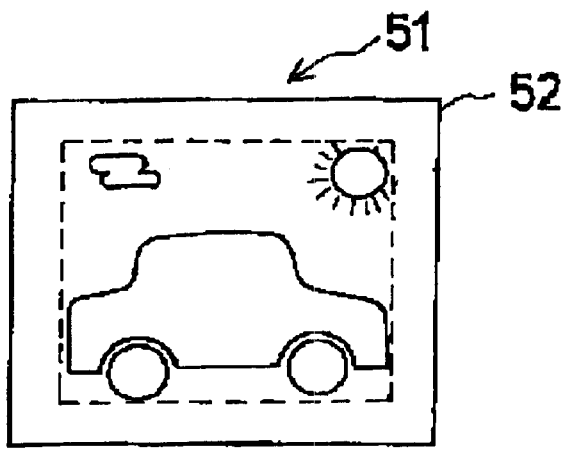
Figure 4C:
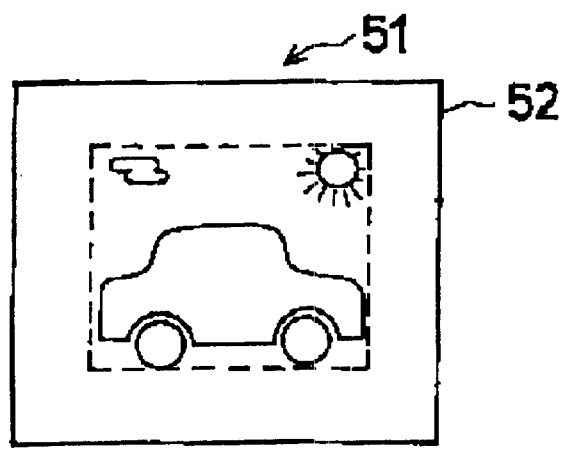

FIGS. 3A–3C show a color difference caused by the de-centered prism 10 and positive lens 20 when light coming from an infinite object enters the optical system from the pupil side and an image of the object is formed at the position of the display device 4. FIG. 3A shows an image formed by red component light, FIG. 3B shows an image of the same object formed by green component light, and FIG. 3C shows an image of the same object formed by blue component light. As can be seen from the figure, the red image is larger than the green image, which is larger than the blue image. This difference is caused by the chromatic aberration of magnification of the optical system. When the optical system is used for observing an image appeared on the display device 4, the relationship in size of each color component images becomes in inverse order. Therefore, to cancel the chromatic aberration of magnification of the optical system, the color component images should be displayed on the display screen 4 in a manner such that, as the wavelength become longer, the size of the image becomes larger. This relationship is shown in FIGS. 4A–4C. In these figures, the numeral 52 denotes the image plane of the image display device 4 and rectangles shown by dotted line designate the size of images. FIG. 4A is a red color component image, FIG. 4B a green color component image, and FIG. 4C a blue color component image. The difference in size of these images is adapted for canceling the chromatic aberration of the optical system.

The same principle is also applicable when the optical system is used for an image projection optical system.

The data lists of the numerical examples 1 and 2 are shown below. As shown in FIG. 1, the axial chief ray 2 is defined as a light ray passing through the center of the exit pupil and the center of the image display device. The coordinate system used for representing the data of the de-centered surface is so defined that the origin is set at the center of the pupil, the Z-axis is set along the axial chief ray and its plus sign is given in the direction from the pupil toward the positive lens 20, the plane in which the axial chief ray travels is defined as a Y-Z plane, the X-axis is set as a line perpendicular to the Y-Z plane at the origin of the coordinate system and its plus sign is in the direction from the backside toward the front side of the paper on which FIG. 1 is drawn, and the Y-axis is set to construct a right-handed coordinate system with the X-axis and Z-axis.

Figure 5A:
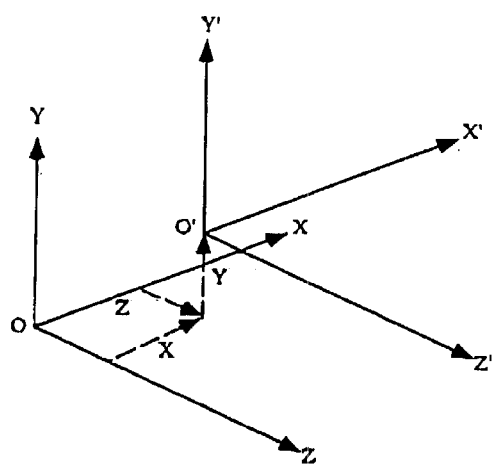
FIGS. 5A–5D show coordinate systems used for representing the de-centering data of the numerical examples of this invention.
Figure 5B:
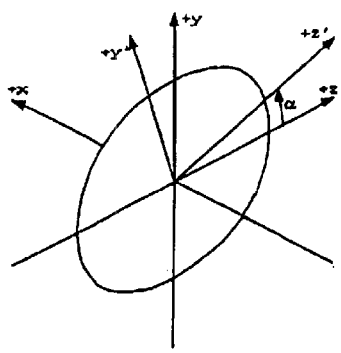
Figure 5C:
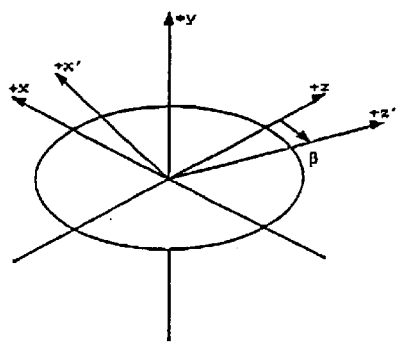
Figure 5D:
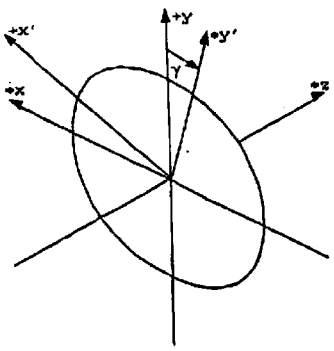

The de-centered surface has its own sub-coordinate system whose origin coincides with the apex of the surface and is independent of the basic-coordinate system described above and the relationship between the basic-coordinate and the sub-coordinate are given as the de-centering data. In FIGS. 5A–5D, the basic-coordinate system is shown as XYZ-coordinate system and the sub-coordinate system is shown as X'Y'Z'-coordinate system. The de-centering data is given as a combination of the displacement and rotation of the sub-coordinate system relative to the basic-coordinate system. FIG. 5A shows the displacement and the coordinates of the origin of the sub-coordinate system in the basic-coordinate system is given as X, Y and Z in the numerical examples. FIGS. 5B through 5D show the rotation of the sub-coordinate system relative to the state that the X-, Y- and Z-axes coincide with the X'-, Y- and Z'-axes, respectively. The rotation angle around the X-axis is designated by an angle □ in FIG. 5B, the rotation angle around the Y-axis is designated by an angle □ in FIG. 5C, and the rotation angle around the Z-axis is designated by an angle □ in FIG. 5D. The signs of □ and □ are positive when the sub-coordinate system rotates counterclockwise and the sign of □ is positive when the sub-coordinate system rotates clockwise as shown by arrow indicating each angle in FIGS. 5B through 5D. The rotation is conducted in order of □, □ and □. When the shape of the de-centered surface is given by a mathematical function, the sub-coordinate system is used in order to express the function.

When one optical surface and a successive optical surface constitute a coaxial system, the distance between these optical surfaces is given in the data list. The refractive indices and Abbe's numbers are given in a well-known expression.

The free shaped surface used in the numerical examples as a de-centered optical surface is expressed by the following formula, and the Z-axis is a centerline of the optical surface:

$$Z = C_2 X + C_3 Y$$
$$+ C_4 X^2 + C_5 XY + C_6 Y^2$$
$$+ C_7 X^3 + C_8 X^2 Y + C_9 XY^2 + C_{10} Y^3$$
$$+ C_{11} X^4 + C_{12} X^3 Y + C_{13} X^2 Y^2 + C_{14} XY^3 + C_{15} Y^4$$
$$+ C_{16} X^5 + C_{17} X^4 Y + C_{18} X^3 Y^2 + C_{19} X^2 Y^3 + C_{20} XY^4 +$$
$$C_{21} Y^5 + C_{22} X^6 + C_{23} X^5 Y + C_{24} X^4 Y^2 + C_{25} X^3 Y^3 +$$
$$C_{26} X^2 Y^4 + C_{27} XY^5 + C_{28} Y^6$$
$$+ C_{29} X^7 + C_{30} X^6 Y + C_{31} X^5 Y^2 + C_{32} X^4 Y^3 + C_{33} X^3 Y^4$$
$$+ C_{34} X^2 Y^5 + C_{35} XY^6 + C_{36} Y^7 \qquad (A)$$

where $C_j$ (j is integer equal to or more than 2) is a coefficient.

In the above formula, when the odd terms of X are all zero (0), that is, when the coefficients $C_2$, $C_5$, $C_7$, $C_9$, $C_{12}$, $C_{14}$, $C_{16}$, $C_{18}$, $C_{20}$, $C_{23}$, $C_{25}$, $C_{27}$, $C_{29}$, $C_{31}$, $C_{33}$, $C_{35}$, ... are all zero, the free shaped surface is symmetric only with respect to a plane parallel to the Y-Z plane.

The rotationally symmetric aspherical surface used in the numerical examples is defined by the following equation:

$$Z = (y^2/R)/[1 + \{1 - (1+K)y^2/R^2\}^{1/2}] + Ay^4 + By^6 + Cy^8 + Dy^{10} + \qquad (B)$$

where the Z-axis coincides with an optical axis (axial chief ray) whose plus sign is in the light traveling direction, the Y-axis is perpendicular to the Z-axis. R is the radius of curvature of the surface on the optical axis, K is a conic constant, and A, B, C, D, ... are aspheric coefficients of 4-th order, 6-th order, 8-th order, 10-th order, ..., respectively. The Z-axis is an axis of rotational symmetry of the aspherical surface.

The values of the terms not given in the data are zero. The refractive indices are given as the numerical data for a d-line, that is, data at a wavelength of 587.56 nm. The unit of length is mm.

In the following numerical example 1, the angle of view is 30.0° in the horizontal direction and 22.7° in the vertical direction, the size of the image display surface of the image display device is 11.26 mm×8.45 mm, and the diameter of the exit pupil is 4 mm. In the numerical example 2, the angle of view is 18.0° in the horizontal direction and 13.5° in the vertical direction, the size of the image display surface of the image display device is 3.86 mm×2.90 mm, and the diameter of the exit pupil is 4 mm.

In the data list shown below, FFS represents a free shaped surface, ASS represents an aspherical surface, RE represents a reflecting surface, and VP represents a virtual plane.

Data List of the Numerical Example 1

| No. of surface | Radius of curvature | space of surfaces | de-centering data | Refractive index | Abbe's number |
|---|---|---|---|---|---|
| Object | ∞ | −1000.00 | | | |
| 1 | ∞ | | Dec1 | | |
| 2 | FFS1 | | Dec2 | 1.5254 | 56.2 |
| 3 | −230.69 | | Dec3 | | |
| 4 | −230.69 | | Dec4 | 1.5254 | 56.2 |
| 5 | FFS2(RE) | | Dec5 | 1.5254 | 56.2 |
| 6 | −230.69 | | Dec4 | 1.5254 | 56.2 |
| 7 | FFS3 | | Dec6 | | |
| Image | ∞ | | | | |

| | FFS1 | FFS2 | FFS3 |
|---|---|---|---|
| c4 | $1.6721 \times 10^{-2}$ | $-6.4348 \times 10^{-3}$ | $-6.4264 \times 10^{-3}$ |
| c6 | $1.5309 \times 10^{-2}$ | $-6.8583 \times 10^{-3}$ | $-1.3499 \times 10^{-2}$ |
| c8 | $-5.3086 \times 10^{-5}$ | $-1.4895 \times 10^{-5}$ | $3.2570 \times 10^{-4}$ |
| c10 | $2.0805 \times 10^{-4}$ | $6.6582 \times 10^{-5}$ | $-5.3245 \times 10^{-5}$ |
| c11 | $3.6333 \times 10^{-6}$ | $2.3072 \times 10^{-7}$ | $7.0349 \times 10^{-5}$ |
| c13 | $1.4290 \times 10^{-5}$ | $1.2768 \times 10^{-6}$ | $1.8846 \times 10^{-4}$ |
| c15 | $-1.0514 \times 10^{-6}$ | $-9.3562 \times 10^{-7}$ | $8.8921 \times 10^{-5}$ |
| c17 | $-4.8680 \times 10^{-7}$ | $-1.5547 \times 10^{-7}$ | $3.7078 \times 10^{-7}$ |
| C19 | $7.4538 \times 10^{-7}$ | $2.2295 \times 10^{-7}$ | $-1.3911 \times 10^{-5}$ |
| C21 | $-1.2441 \times 10^{-7}$ | $1.0236 \times 10^{-7}$ | $-7.2365 \times 10^{-6}$ |

| [Dec1] | | | [Dec2] | | |
|---|---|---|---|---|---|
| X 0.00 | Y 0.00 | Z 0.00 | X 0.00 | Y 0.00 | Z 28.36 |
| α 0.00 | β 0.00 | γ 0.00 | α 5.14 | β 0.00 | γ 0.00 |
| [Dec3] | | | [Dec4] | | |
| X 0.00 | Y 4.27 | Z 32.68 | X 0.00 | Y 4.27 | Z 32.78 |
| α 20.66 | β 0.00 | γ 0.00 | α 20.66 | β 0.00 | γ 0.00 |
| [Dec5] | | | [Dec6] | | |
| X 0.00 | Y 0.36 | Z 40.69 | X 0.00 | Y 11.57 | Z 35.78 |
| α −12.27 | β 0.00 | γ 0.00 | α 72.49 | β 0.00 | γ 0.00 |
| [Dec7] | | | | | |
| X 0.00 | Y 17.51 | Z 38.51 | | | |
| α −114.93 | β 0.00 | γ 0.00 | | | |

Data List of the Numerical Example 2

| No. of surface | Radius of curvature | space of surfaces | de-centering data | refractive index | Abbe's number |
|---|---|---|---|---|---|
| Object | ∞ | −1000.000 | | | |
| 1 | ∞(pupil) | | Dec. 1 | | |
| 2 | 193.73 | | Dec. 2 | 1.5254 | 56.2 |
| 3 | ASS1 | | Dec. 3 | | |
| 4 | ASS2 | | Dec. 4 | 1.5254 | 56.2 |
| 5 | FFS1 (RE) | | Dec. 5 | 1.5254 | 56.2 |
| 6 | ASS2 (RE) | | Dec. 4 | 1.5254 | 56.2 |
| 7 | FFS2 | | Dec. 6 | | |
| 8 | ∞ (VP) | 1.96 | Dec. 7 | | |
| Image | ∞ | | | | |

| | ASS1 | ASS2 |
|---|---|---|
| R | −43.95 | −43.95 |
| K | 0.0000 | 0.0000 |
| A | $1.3421 \times 10^{-5}$ | $1.3421 \times 10^{-5}$ |
| B | $-1.0210 \times 10^{-7}$ | $-1.0210 \times 10^{-7}$ |

| | FFS1 | FFS2 |
|---|---|---|
| C4 4 | $-1.6396 \times 10^{-2}$ | $1.6353 \times 10^{-3}$ |
| C6 6 | $-1.7516 \times 10^{-2}$ | $-7.3656 \times 10^{-2}$ |
| C8 8 | $-1.4808 \times 10^{-5}$ | $3.4549 \times 10^{-3}$ |
| C10 10 | $1.2218 \times 10^{-4}$ | $-9.3494 \times 10^{-6}$ |
| C11 11 | $-3.2056 \times 10^{-6}$ | $-1.3298 \times 10^{-5}$ |
| C13 13 | $-5.8447 \times 10^{-6}$ | $-3.0780 \times 10^{-5}$ |
| C15 15 | $-5.0578 \times 10^{-6}$ | |
| C17 | $1.3131 \times 10^{-8}$ | $5.1350 \times 10^{-6}$ |
| C19 | $4.8170 \times 10^{-8}$ | $-6.5931 \times 10^{-6}$ |
| C21 | $2.8817 \times 10^{-8}$ | |

[Dec. 1]

| X 0.00 | Y 0.00 | Z 0.00 |
| α 0.00 | β 0.00 | γ 0.00 |

[Dec2]

| X 0.000 | Y 0.00 | Z 23.00 |
| α 0.00 | β 0.00 | γ 0.00 |

[Dec. 3]

| X 0.00 | Y 3.47 | Z 25.8 |
| α 29.91 | β 0.00 | γ 0.00 |

[Dec4]

| X 0.00 | Y 3.47 | Z 25.93 |
| α 29.91 | β 0.00 | γ 0.00 |

[Dec. 5]

| X 0.00 | Y −0.03 | Z 33.47 |
| α −12.47 | β 0.00 | γ 0.00 |

[Dec6]

| X 0.00 | Y 8.59 | Z 26.39 |
| α79.97 | β 0.00 | γ 0.00 |

[Dec. 7]

| X 0.00 | Y 8.59 | Z 26.39 |
| α 87.23 | β 0.00 | γ 0.00 |

Figure 6:
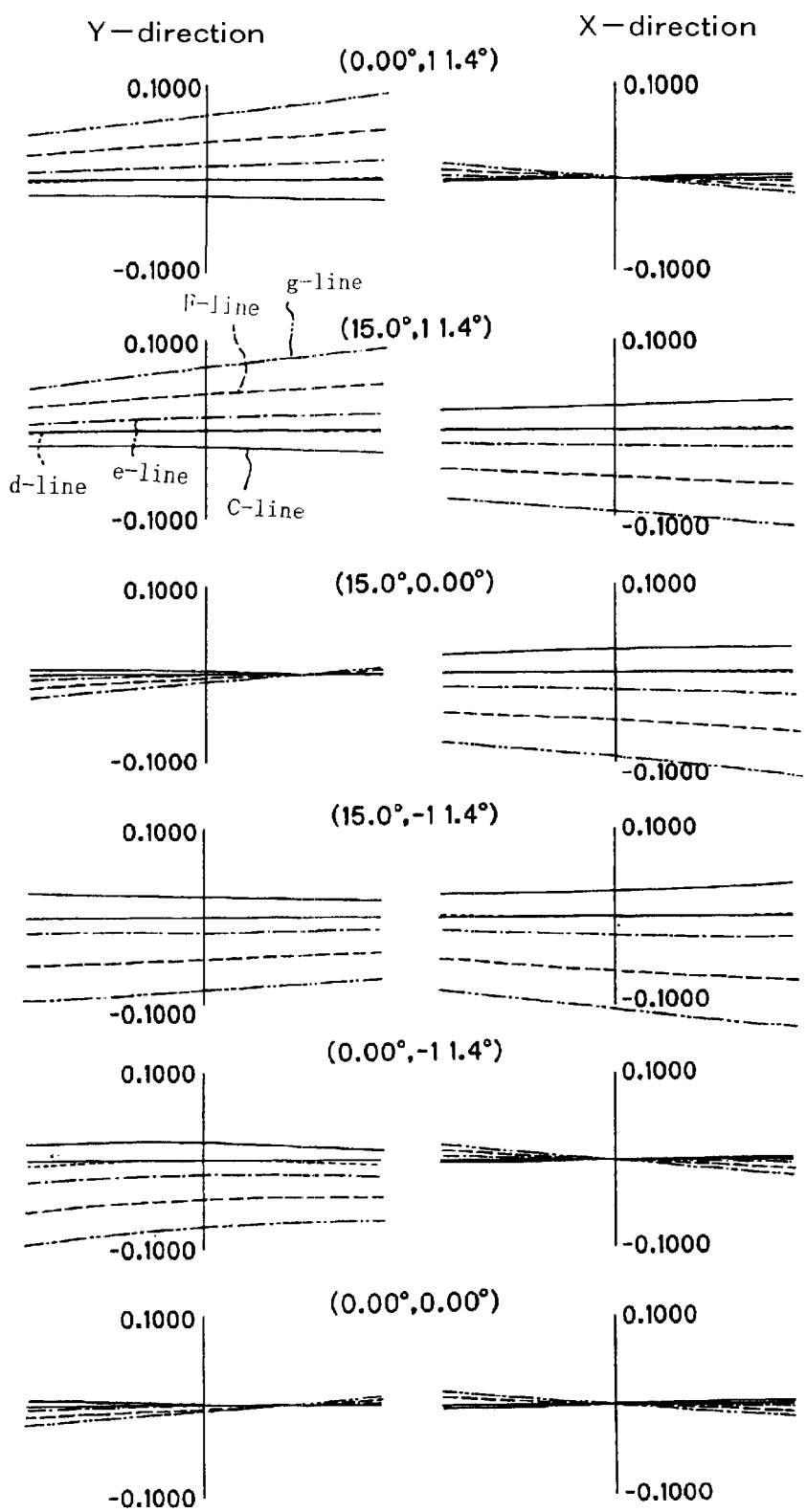
FIG. 6 is a series of graphs of lateral aberration of the first example.

FIG. 6 is a series of graphs of lateral aberration of the numerical example 1. In the figure, the numerals written in parenthesis designate the angle of view in the horizontal and vertical directions in this order and each graph shows the lateral aberration at the designated angle of view.

The following are values of parameters appearing in the numerical condition (1) and (2).

| | Fx | Fy | F2x | F2y | Fx/F2x | Fy/F2y |
|---|---|---|---|---|---|---|
| Numerical example 1 | 21.10 | 20.87 | 50.25 | 49.31 | 0.4199 | 0.4232 |
| Numerical example 2 | 12.45 | 12.92 | 59.52 | 45.68 | 0.2091 | 0.2828 |

Figure 7:
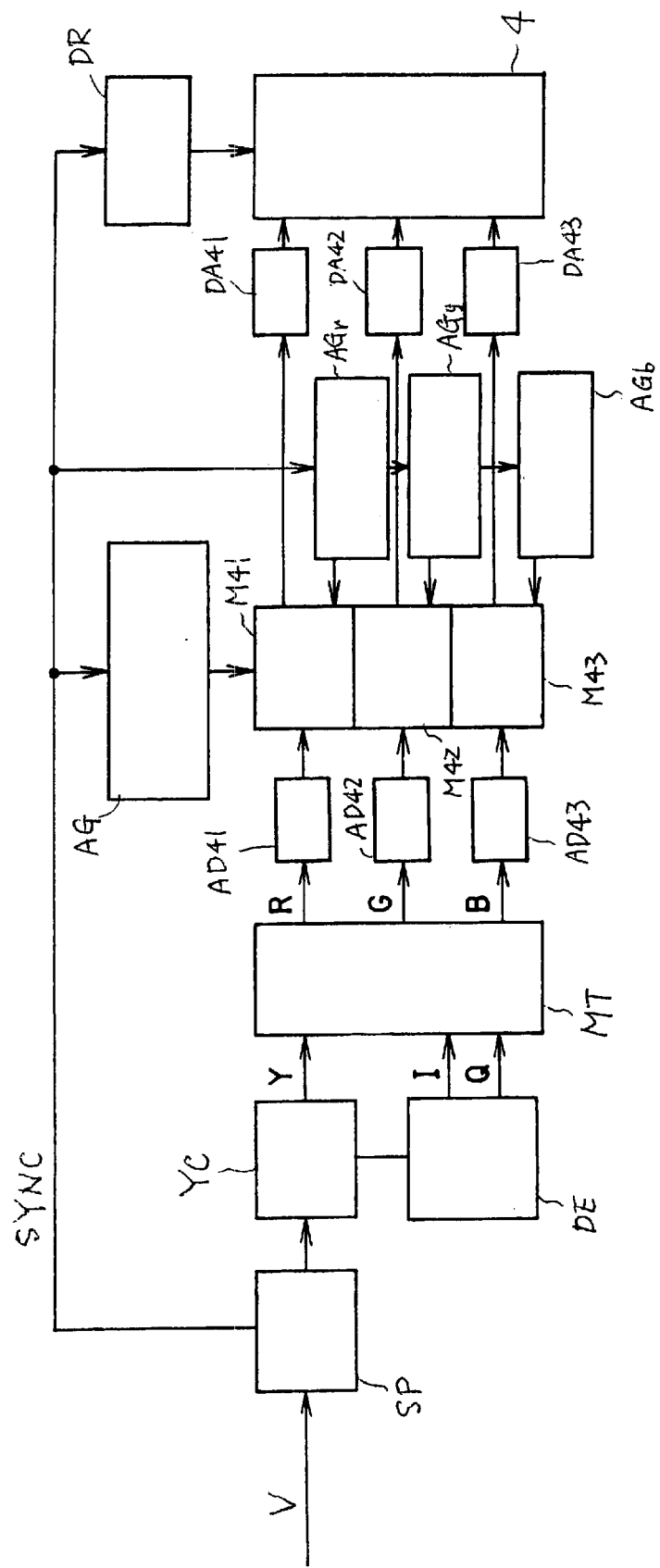
FIG. 7 is a block diagram of an example of an image signal processing system used in order to vary the size of the images to be displayed on a color LCD display device color by color.

Next, a signal processing system for supplying a video signal to an image display device 4 in order to display images different in size with color by color for the purpose of eliminating the chromatic aberration of the optical system is described based on the block diagram is shown in FIG. 7. The video signal V is divided into an image signal and synchronizing signal SYNC by the synchronizing signal separation block SP. This image signal is separated into three primary color component signals of R, G, and B by the Y/C separation block YC, decoder DE and matrix circuit MT. Each component signal R, G and B is converted into a digital signal by A/D converters AD41 through AD43 and stored in memories M41 through M43, respectively. The addressing signal for storing the digital data in the memory is produced by the address generator AG. The read-out timing of the R, G and B component signals from the memories M41 through M43 is controlled by the addressing signals generated from the each of the R, G and B addressing signal generators AGr, AGg and AGb in order to differentiate the image size of each color reproduced on the image display device and to eliminate the chromatic aberration of the optical system. Each R, G and B component signal is converted into an analog signal by the D/A converters DA41 through DA43 and supplied to the image display device, that is, color LCD 4. DR is a LCD driver.

The system described above is only an example and other system may be used for the same purpose.

Figure 8:
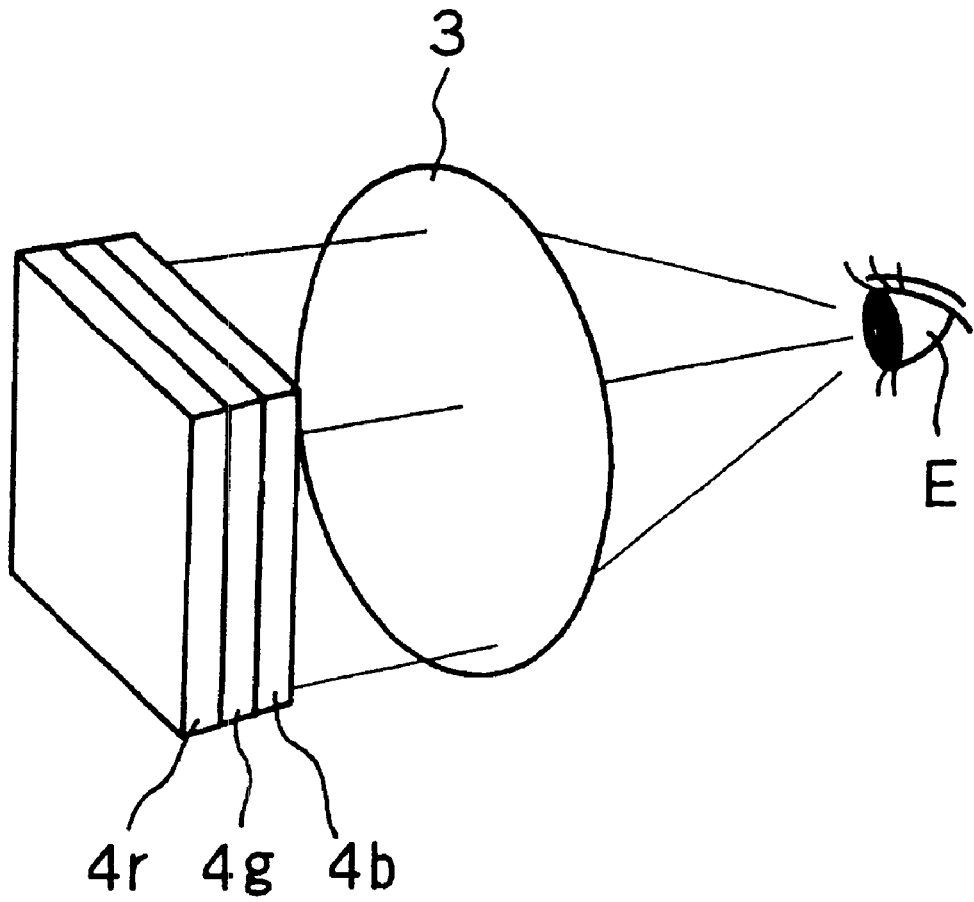
FIG. 8 is a diagrammatic view of an example of an image display device.

FIG. 8 is schematic view of a different type of the image reproducing system. The image display device 4 is constructed of three color LED display devices of a red color image display device 4r, a green color image display device 4g and a blue color image device 4b stacked in contact or substantially contact with each other. Each LED display device is constructed by arraying LEDs of one of the colors on a transparent substrate.

Each image that appears on the display devices 4r, 4g and 4b is focused at the observer's eye (on the retina of the observer's eye) by an ocular optical system 3 according to this invention which is shown as a single lens for simplification. Therefore, the substrate is made of a thin glass plate. The sizes of the image display surface of these three display devices are different from each other in order to eliminate the chromatic aberration of the ocular optical system. Concretely speaking, the green display device 4g has a display surface 1% smaller in horizontal and vertical directions than that of the red display device 4r, and the blue display device 4b has a display surface 2% smaller in horizontal and vertical directions than that of the red display device 4r.

The light emanated from each display device 4r, 4g or 4b is led to the observer's eye E through the ocular optical system 3 and an image of each color is formed on the retina of the observer's eye E. Each color image size appearing on the display surface is different dependent on the size of image displaying surface of each display device. However this difference is cancelled out by the chromatic aberration of magnification of the ocular optical system 3 and the observer can watch an image as if there were no chromatic aberration of magnification.

This system in which three color display devices are provided allows simplifying the image processing system. Moreover, as the sizes of image display surfaces are different from each other, an aperture restricting means to achromatize the image frame is not necessary and difficulty of manufacturing decreases.

In addition to this, this example allows canceling out the longitudinal chromatic aberration of the ocular optical system as well as the chromatic aberration of magnification.

In general, a positive lens has a weaker optical power for a longer wavelength and its focal length becomes long as the wavelength becomes long. Therefore, when a plurality of wavelengths are focused simultaneously by the same lens, the positions of the images of the plurality of wavelengths are different in the direction of the optical axis.

When the display device displaying an image formed by light for which the optical power of the ocular optical system is weaker is placed farther from the optical system in the direction of the optical axis, the longitudinal chromatic aberration of the optical system is cancelled out by the difference in position of the displayed images and the observer can watch an image as if the optical system had no chromatic aberration. In this example, the blue image display device 4b, the green image display device 4g and red image display device 4r are arranged in this order in the direction from the observer's eye toward the ocular optical system and therefore, the longitudinal chromatic aberration of the ocular optical system is cancelled.

Figure 9:
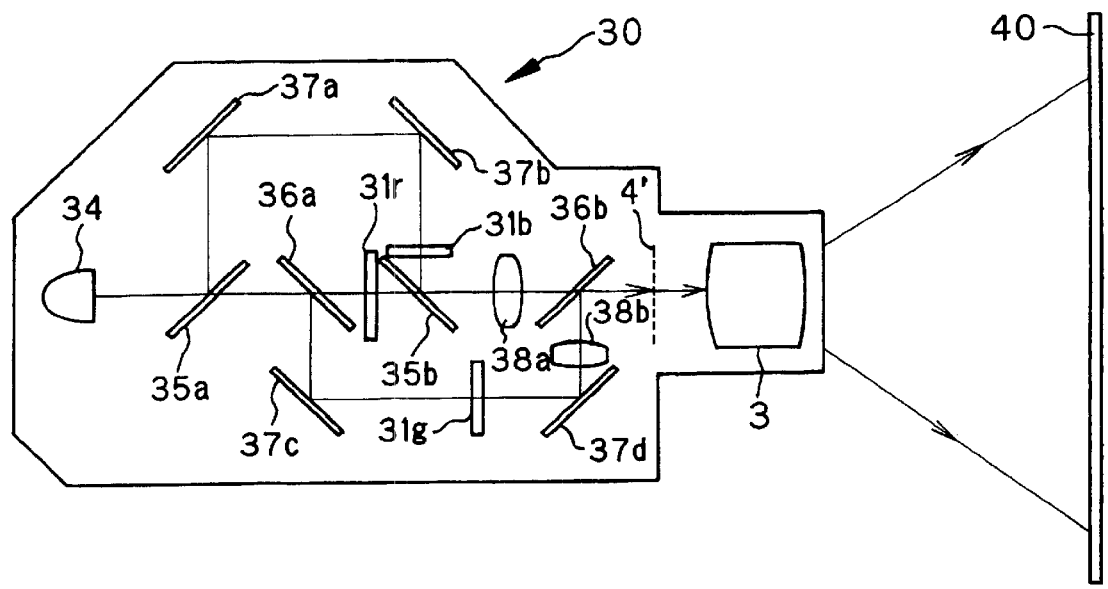
FIG. 9 is a diagrammatic view of an example of a portable LCD image projection apparatus equipped with an optical system according to this invention.

Next, an example of a portable LCD projection TV system using the de-centered optical system according to this invention is described. FIG. 9 is a schematic view of this example. The projection TV system 30 has a light source 34 emitting a substantially parallel light bundle. 35a and 35b are dichroic mirrors reflecting blue light, 36a and 36b are dichroic mirrors reflecting green light. 37a, 37b, 37c and 37d are reflecting mirrors. 38a and 38b are relay lenses. 31r, 31g and 31b are transmission type LCD display devices displaying a red image, green image and blue image respectively whose size of image display surface is different from each other so as to cancelled out the chromatic aberration of magnification and longitudinal chromatic aberration of the projection optical system 3 according to this invention which is shown as a single lens for simplification. The image display surfaces of the display device 31r, 31g and 31b are positioned on planes conjugate with the front focal planes of the projection optical system 3 for each corresponding color of light.

The light emitted from the light source 34 including the primary color components of R, G and B is incident on the dichroic mirror 35a and the blue component is reflected. Other color components transmitted through the dichroic mirror 35a are incident on the dichroic mirror 36a and the green component is reflected. The blue component is reflected by the mirrors 37a and 37b, and then, is incident on the blue LCD display panel 31b. The green light component is reflected by the mirrors 37c and 37d, and then, is incident on the green LCD display panel 31g. The red component transmits through dichroic mirror 36a and is incident on the red LCD display panel 31r. The blue and red color light components are modulated in amplitude by the images displayed on the blue LCD display panel and the red LCD display panel, respectively, and combined by the dichroic mirror 35b. The green color light component is modulated in amplitude by the image displayed on the green LCD display panel. The green color component is reflected by the mirror 37d and combined by the dichroic mirror 36b with the blue and red color components. The red and blue components form an image via the relay lens 38, and the green component forms via the relay lens 38b, in the vicinity of the image plane 4' of the projection optical system 3 with approximately 1×magnification. This composite color image is projected onto the screen 40 by the projection optical system 3. As mentioned above, the size of the display surface of each color LCD 31r, 31g and 31b is different in order to cancel the chromatic aberration of magnification of the projection optical system. The red and blue color LCDs 31r and 31b are placed at conjugate positions of the front focal plane of the projection optical system 3 for the corresponding color light of the image plane 4' with respect to the relay lens 38a and the green color LCD 31g is placed in a same manner with respect to the relay lens 38b. The difference in size and position in the direction of the optical axis of these images cancel both the chromatic aberration of magnification and longitudinal chromatic aberration of the projection optical system. Therefore, a clear image can be obtained on the screen 40 as if the projection optical system had no chromatic aberration.

In the example shown in FIG. 8, the display devices should be thin because the thickness should be equalized to the longitudinal chromatic aberration of the ocular optical system. On the other hand, in this example, the longitudinal chromatic aberration is easily eliminated by adjusting the positions of each color LCD display devices, mirrors, dichroic mirrors and relay lenses in the light traveling direction and no thin LCD display devices are necessary. Therefore, in this example, a various kinds of image display devices can be used. For example, CRT displays may be used as a substitute for the color LCD displays at the same positions and in that case, light source 34, dichroic mirrors 35a, 36a, and mirrors 37a, 37b and 37c may be removed. Display devices other than CRT also may be used.

The optical system 3 according to this invention may be used as an image taking optical system or an objective optical system by making the light inversely travel as compared to the case when it is used as an ocular or a projection optical system and arranging a film or an image pickup device at a position of the image display device 4.

Figure 10:
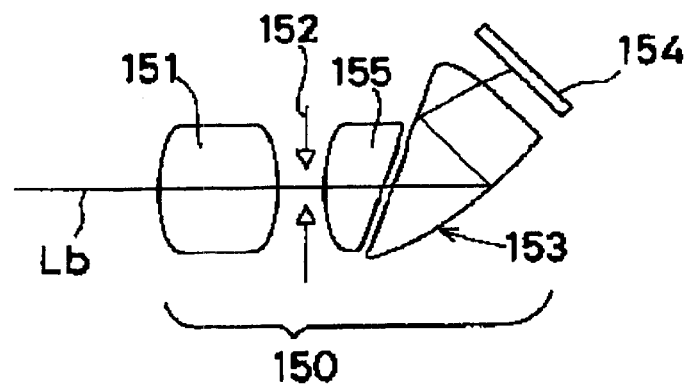
FIG. 10 is a sectional view of an example of this invention used for an image taking optical system.

Such an example is described based on FIG. 10. This figure shows an optical system of an image taking apparatus. The reference numeral 152 denotes an aperture stop positioned on the pupil. A positive lens 155 acting as a second optical element and a positive lens 151 as a third optical element are arranged with the aperture stop interposed therebetween. The reference numeral 154 is an image pickup device such as a CCD imager arranged at an image position. A de-centered prism 153, acting as a first optical element, is positioned between the second optical element 155 and the image pickup device 154. The de-centered optical element 153 and the positive lens 155 may be the numerical examples 1 or 2.

Figure 11:
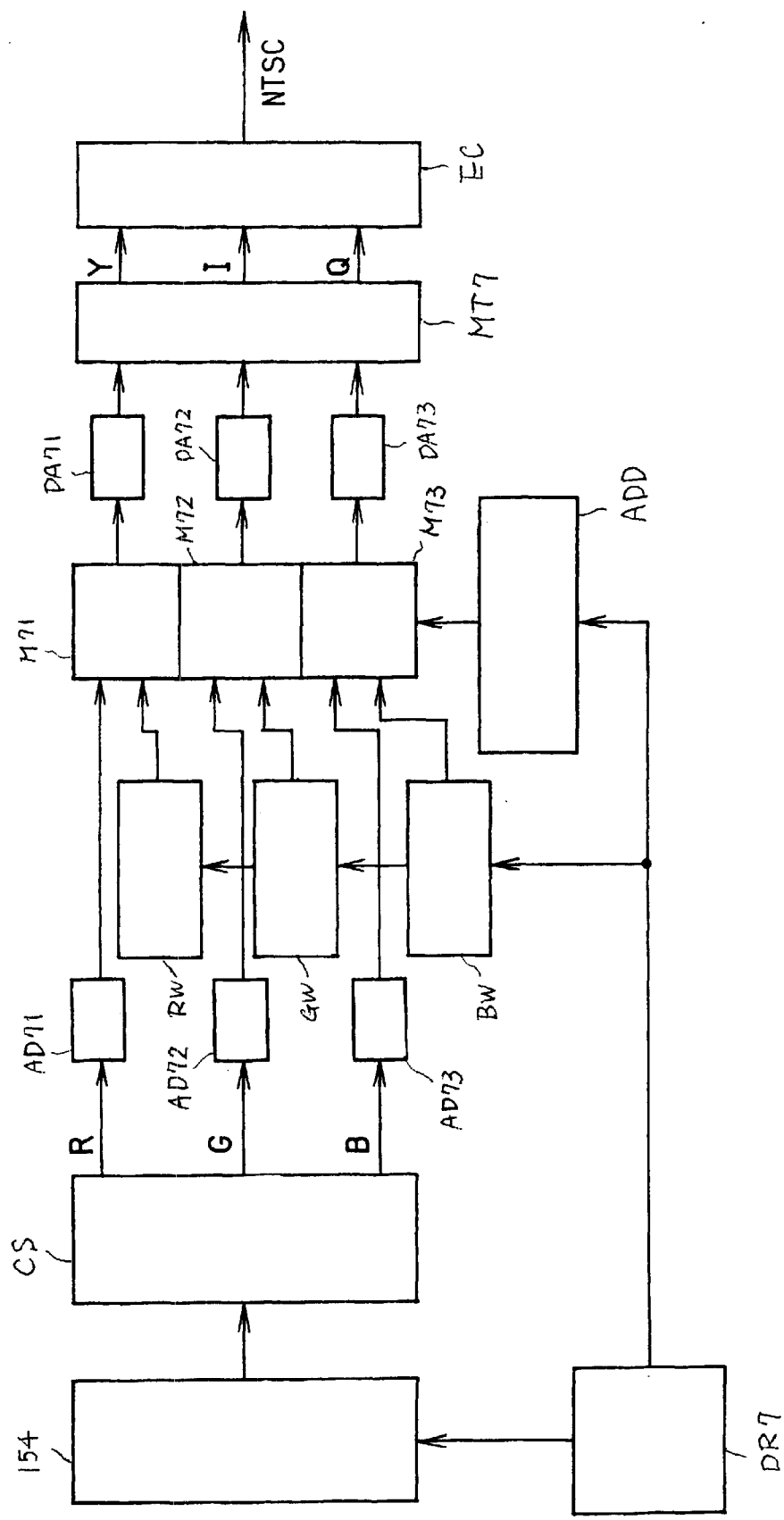
FIG. 11 is a block diagram of an example of an image signal processing system used in order to electrically cancel the chromatic aberration of magnification caused by the optical system.

An image signal processing system used with the image taking optical system is shown in FIG. 11 as a block diagram. Here the image pickup device is a color CCD imager and this processing system electronically compensates the shift of the image pixels of the R, G and B components obtained from the color CCD imager due to the chromatic aberration of magnification of the image taking optical system. The CCD imager 154 receives an image formed by the image taking optical system and produces an image signal. This image signal is divided into three color components of R, G and B by the color separation block CS. Each color component signal is converted into a digital signal by the A/D converters AD71 through AD73 and stored in the memories M71 through M73. In order to cancel the chromatic aberration of the image taking optical element, the address in the memories M71 through M 73 in which each pixel data of the R, G and B component signal is stored is shifted by the write address signal generated from the address signal generator RW, GW, and BW. This address signal is produced from the clock signal from the CCD driver DR7. The read-out address signal is also generated from the drive signal from the CCD driver by the read-out address generator ADD. The data read out from the memories M71 through M73 is converted into an analog signal by the D/A converters DA71 through DA73 and processed in the matrix block MT7 and encoder EC and a video signal such as an NTSC format signal is outputted. This system is an example and other system can be used for the same purpose.

This invention provides an optical system and an optical apparatus small in size, having a wide angle of view, and realizing a high quality of image for the chromatic aberration.

So far this invention is explained in detail based on the examples. However, as a matter of course, this invention is not limited to these examples and widely applicable to many kind of optical apparatus of an image observation system, an image projection apparatus, an image taking apparatus and so forth. More particularly, as examples of an image observation apparatus, a viewfinder of an electronic apparatus such as a camera, head mounted display apparatus, mobile computer with camera, a cellular phone with camera, or the like can be considered. As examples of the projection apparatus, a variety of projectors such as a projection TV, a projection apparatus used for projecting an image to a screen can be enumerated. As examples of the image taking apparatus, a photographic camera using a silver salt film as an image storage device, a video camera using a magnetic tape or disc as an image storage device, an electronic camera using an electronic image pickup device such as a digital camera, a cellular phone with an image taking function, a personal computer with an image taking function, can be included. All modifications and applications under the basic concept of this invention are also included in the scope of this invention.

What is claimed is:

1. A de-centered optical system comprising:
   a first optical element and a second optical element each of which is disposed between a pupil and an image;
   the first optical element being a prism having at least three optical surfaces including first, second and third optical surfaces, and a portion surrounded by these three surfaces being made of a medium having a refractive index of more than 1;
   the first optical surface being positioned closest to the pupil among these three surfaces and having a function of refracting light and a function of reflecting light inside the optical element;
   the third optical surface being positioned closest to the image surface among these three surfaces and having a function of refracting light;
   the second optical surface being disposed on a de-centered position from an optical axis which is a center line of a light bundle, and shaped as a curved surface having a positive optical power when reflecting light inside the optical element;
   the second optical element being disposed on the pupil side of the first optical element, having a positive optical power, and at least a surface on the pupil side thereof being a convex surface;
   the second optical element producing a chromatic aberration of magnification;
   wherein the de-centered optical system is so configured that when light goes through the de-centered optical system from the second optical element side to the first optical element, it forms a larger image at a light wavelength region of red than that of green, and at a light wavelength region of green than that of blue; and
   the first optical element and the second optical element satisfy at least one of the following conditions (1) and (2):

$$0.1 < Fy/F2x < 1 \quad (1)$$

$$0.1 < Fx/F2y < 1 \quad (2)$$

wherein, when assuming a light ray passing through the center of the exit pupil and the center of the image surface as an axial chief ray, a plane in which the axial chief ray travels as a Y-Z plane and a direction in which the optical system is de-centered as a Y-axis, Fy is a focal length of the optical system in the Y-direction, Fx is a focal length of the optical system in an X-direction perpendicular to the Y-Z plane, F2y is a focal length of the second optical element in the Y-direction, and F2x is a focal length of the second optical system in the X-direction.

2. A de-centered optical system according to claim 1, wherein
   at least one of the optical surfaces of the first optical element is formed as a rotationally asymmetric curved surface having an optical power and correcting aberrations caused by de-centering.

3. A de-centered optical system according to claim 1, wherein
   the second optical surface of the first optical element is formed as a rotationally asymmetric curved surface having an optical power and correcting aberrations caused by de-centering.

4. A de-centered optical system according to claim 1, wherein
   the third optical surface of the first optical element is formed as a rotationally asymmetric curved surface having an optical power and correcting aberrations caused by de-centering.

5. A de-centered optical system according to claim 1, wherein
   an optical surface of the second optical element that is closest to the first optical surface of the first optical element and the first optical surface are formed with substantially the same shape.

6. An image observation apparatus having a de-centered optical system according to claim 1 for use as an ocular optical system, further comprising:

an image display device disposed on the image surface, wherein light emanated from said image display device is transmitted through the first optical element and then the second optical element, and reaches an eye point on the pupil, and wherein the image display device displays images different in size depending on the color thereof in order to cancel at least a chromatic aberration of magnification of the second optical element.

7. An image observation apparatus according to claim 6, wherein the image display device has an electronic circuit to supply video images different in size depending on the color thereof to the image display device.

8. An image projection apparatus having a de-centered optical system according to claim 1 for use as a projection optical system, comprising:

an image display device disposed on the image surface;

a third optical element having a positive optical power, the pupil being positioned between the second optical element and the third optical element;

wherein light emanating from the image display device is transmitted through the first optical element, the second optical element, and then the third optical element, and reaches a screen on which a real image of the image displayed on the image display device is formed; and wherein the image display device displays images different in size depending on the color thereof in order to cancel at least a chromatic aberration of magnification of the second optical element.

9. An image projection apparatus according to claim 8, wherein the image display device includes an electronic circuit to supply video images different in size depending on the color thereof to the image display device.

10. An image taking apparatus having the de-centered optical system according to claim 1 as an image taking optical system, comprising:

an image pickup device disposed on the image surface that receives light emanating from an object and transmitted through the second optical element and then the first optical element.

11. An image projection apparatus having a de-centered optical system for use as a projection optical system, comprising:

a first optical element and a second optical element each of which is disposed between a pupil and an image;

the first optical element being a prism having at least three optical surfaces including first, second and third optical surfaces, and a portion surrounded by these three surfaces being made of a medium having a refractive index of more than 1;

the first optical surface being positioned closest to the pupil among these three surfaces and having a function of refracting light and a function of reflecting light inside the optical element;

the third optical surface being positioned closest to the image surface among these three surfaces and having a function of refracting light;

the second optical surface being disposed on a de-centered position from an optical axis which is a center line of a light bundle, and shaped as a curved surface having a positive optical power when reflecting light inside the optical element;

the second optical element being disposed on the pupil side of the first optical element, having a positive optical power, and at least a surface on the pupil side thereof being a convex surface;

the second optical element producing a chromatic aberration of magnification;

wherein the de-centered optical system is so configured that when light goes through the de-centered optical system from the second optical element side to the first optical element, it forms a larger image at a light wavelength region of red than that of green, and at a light wavelength region of green than that of blue;

an image display device disposed on the image surface; and a third optical element having a positive optical power, the pupil being positioned between the second optical element and the third optical element;

wherein light emanating from the image display device is transmitted through the first optical element, the second optical element, and then the third optical element, and reaches a screen on which a real image of the image displayed on the image display device is formed; and wherein the image display device displays images different in size depending on the color thereof in order to cancel at least a chromatic aberration of magnification of the second optical element.

12. An image projection apparatus according to claim 11, wherein the image display device includes an electronic circuit to supply video images different in size depending on the color thereof to the image display device.

* * * * *